United States Patent [19]

Pearson

[11] Patent Number: 5,306,879
[45] Date of Patent: Apr. 26, 1994

[54] LOAD MEASURING APPARATUS FOR AN ELEVATOR CAR

[75] Inventor: David B. Pearson, Raritan, N.J.

[73] Assignee: Inventio AG, Hergiswil NW, Switzerland

[21] Appl. No.: 828,103

[22] Filed: Jan. 30, 1992

[51] Int. Cl.⁵ ............................................. G01G 19/14
[52] U.S. Cl. ................................................. 187/131
[58] Field of Search ........................ 187/131, 130, 106

[56] References Cited

U.S. PATENT DOCUMENTS

| | | | |
|---|---|---|---|
| 4,071,116 | 1/1978 | Halperin et al. | 187/131 |
| 4,573,542 | 3/1986 | Schlegel et al. | 177/132 |
| 4,793,442 | 12/1988 | Heckler et al. | 187/115 |
| 4,986,391 | 1/1991 | Salmon | 187/1 R |
| 5,005,671 | 4/1991 | Aime et al. | 187/1 R |

FOREIGN PATENT DOCUMENTS 0151949  8/1985  European Pat. Off. .

OTHER PUBLICATIONS

Product Literature of Efector Inc. for "Efector IA-40-10-DNOG/IA5034" sensor.

Primary Examiner—Kristine L. Peckman
Assistant Examiner—Robert Nappi
Attorney, Agent, or Firm—Sandler, Greenblum & Bernstein

[57] ABSTRACT

The load measuring apparatus is arranged at an elevator car and detects the car load brought about by passengers and/or goods transported by the elevator car. An upper crossbeam together with vertically extending supports and a lower crossbeam forms a support frame suspended at traction cables and moves within an elevator shaft along suitable guide rails. A floor frame mounted on isolation pads at the lower crossbeam carries the elevator car. At the roof of the elevator car there is centrally arranged a reference plate member which is part of the load measuring apparatus. A proximity sensor centrally arranged at the upper crossbeam has a predetermined frontal spacing from the reference plate member in the no-load condition of the elevator car. When the elevator car carries a load this predetermined frontal spacing increases as a function of compression of the isolation pads. The proximity sensor then generates an electrical signal or potential which is dependent upon the momentarily prevailing frontal spacing of the sensor from the reference plate member.

5 Claims, 1 Drawing Sheet

LOAD MEASURING APPARATUS FOR AN ELEVATOR CAR

BACKGROUND OF THE INVENTION

1. Field of the Invention

The present invention relates to a new and improved load measuring apparatus for an elevator car of an elevator structure.

Generally speaking, the load measuring apparatus for an elevator car of the present development is of the type which is supported by a support frame suspended at hoist or traction cables or ropes. The support frame or frame member comprises a lower crossbeam or yoke carrying a floor frame, substantially vertically extending supports or carrier members and an upper crossbeam or yoke operatively connected with the hoist or traction cables or ropes.

2. Discussion of the Background and Material Information

European Published Patent Application No. 0,151,949, published Sept. 9, 1987, and cognate U.S. Pat. No. 4,573,542 issued Mar. 4, 1986, disclose an elevator car containing a car floor or base supported at each corner by a horizontally extending leg of an angle member. The vertically extending legs of the angle member are bolted to a floor frame. The forces acting upon each of the horizontally extending legs are transduced into electrical signals by strain gauges arranged at the associated horizontally extending leg, and such electrical signals are processed by an amplifier circuit.

A drawback of this prior art apparatus resides in the fact that the load measuring apparatus arranged at the region of the floor of the elevator car requires a relatively complicated mechanical construction of the cabin floor and the floor frame. Additionally, the car floor must be supported upon specially designed insulating elements arranged at the horizontally extending legs.

SUMMARY OF THE INVENTION

Therefore, with the foregoing in mind, it is a primary object of the present invention to provide an improved load measuring apparatus for an elevator car which is not afflicted with the aforementioned drawbacks of the prior art.

Another and more specific object of the present invention aims at providing an improved load measuring apparatus for an elevator car which eliminates the previously discussed shortcomings of the prior art construction and enables the elevator car to be directly mounted upon the floor frame.

Still a further noteworthy object of the present invention is the provision of an improved load measuring apparatus for an elevator car wherein the elevator car and the floor frame have the same mechanical construction whether used with or without a load measuring apparatus.

Another significant object of the present invention is directed to an improved load measuring apparatus for an elevator car which can be retrofitted at the elevator car without necessitating mechanical modifications at the elevator car and floor frame.

Now in order to implement these and still further objects of the present invention, which will become more readily apparent as the description proceeds, the load measuring apparatus of the present development is manifested, among other things, by the features that a proximity sensor is arranged a the upper crossbeam or yoke. When the elevator car is or not under load, the proximity sensor is in frontal spaced relationship at a predetermined spacing with respect to a reference plate member arranged at the roof of the elevator car. In the presence of a load at the elevator car this predetermined spacing of the proximity sensor with respect to the reference plate member increases as a function of the compression of the isolation pads located between the elevator car floor and the lower crossbeams of the platform. Furthermore, the proximity sensor carries at a lead or conductor an output potential which is dependent upon the magnitude of the predetermined spacing between the proximity sensor and the reference plate member.

According to a further feature of the present invention, the proximity sensor comprises an inductive proximity sensor and the reference plate member is formed of steel plating. The proximity sensor also may comprise an analog capacitive proximity sensor.

The present invention further contemplates that the mentioned lead of the proximity sensor carry an analog output potential which is dependent upon the magnitude of the predetermined spacing between the proximity sensor and the reference plate member.

One of the more notable advantages of the present invention is the ability of the elevator car and the floor frame to have the same mechanical construction whether used with or without a load measuring apparatus. A still further considerable advantage of the load measuring apparatus of the present development is the possibility of retrofitting such load measuring apparatus at the elevator car without the need to undertake any or at least any extensive mechanical modifications at the elevator car and floor frame.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Describing now the drawings, it is to be understood that only enough of the construction of the load measuring apparatus and related elevator structure has been depicted therein, in order to simplify the illustration, as needed for those skilled in the art to readily understand the underlying principles and concepts of the present invention.

Figure 1:
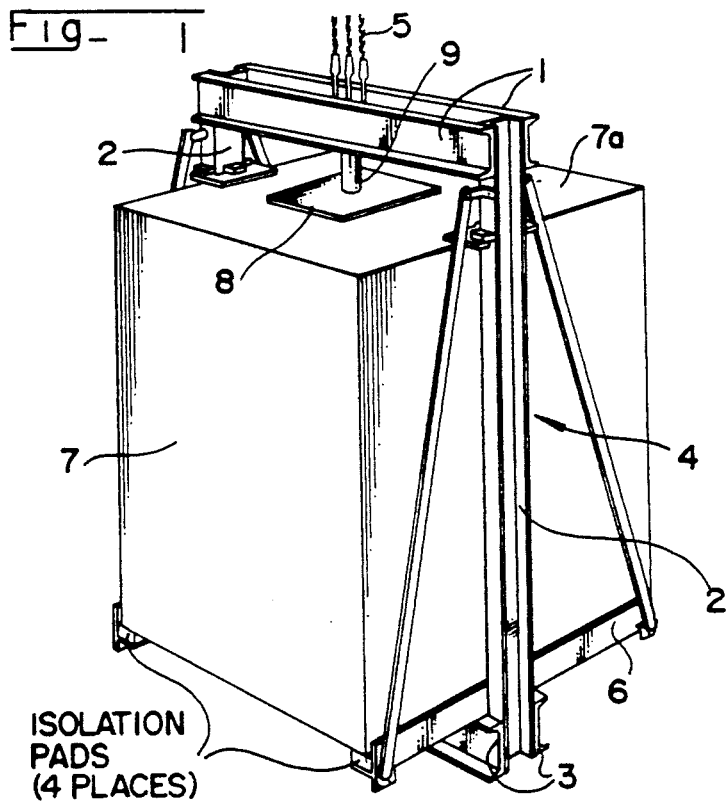
FIG. 1 schematically illustrates an elevator car mounted on isolation pads and carried by a support frame and equipped with a load measuring apparatus constructed according to the present invention.
Figure 2:
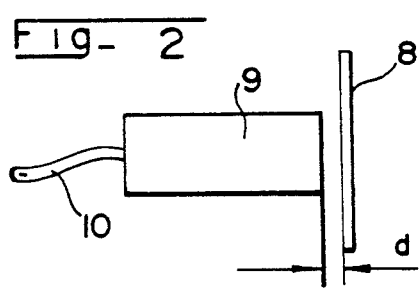
FIG. 2 illustrates details of the inventive load measuring apparatus which comprises a proximity sensor and a reference plate member.

Turning attention first to FIG. 1, reference numeral 1 designates an upper crossbeam or yoke or equivalent structure which, in conjunction with substantially vertical or upright extending support or carrier members 2 and a lower crossbeam or yoke 3, forms a support or carrier frame 4. This support or carrier frame or frame member 4 is suspended at hoist or traction cables or ropes 5 and is movable within an elevator shaft along conventional and thus here not illustrated guide rails.

A floor or base frame 6 resting upon isolation pads located on the lower crossbeam or yoke 3 carries an elevator car 7 of the elevator structure which serves for transporting loads, here for the vertical transport of passengers and/or goods. At the roof 7a of the elevator car 7 there is substantially centrally arranged a reference plate member 8 which is part of the load measuring apparatus of the present development. A proximity sensor 9, which is substantially centrally arranged at the upper crossbeam or yoke 1, is in frontal spaced relationship at a predetermined spacing or distance d with respect to the reference plate member 8 in a no-load condition of the elevator car 7. As will be considered shortly, the proximity sensor 9 may be an inductive or capacitive proximity sensor. This predetermined spacing or distance d of the proximity sensor 9 with respect to the reference plate member 8 increases, as a function of the compression of the isolation pads located between the elevator car floor and the lower crossbeams of the platform, in the presence of a load condition at the elevator car 7. As a result, the proximity sensor 9 generates an electrical signal which is carried at its output lead or conductor 15 in the form of an output potential Ua (see also FIG. 4), preferably an analog output potential or signal, which is dependent upon the magnitude of the predetermined spacing d currently prevailing between the proximity sensor 9 and the reference plate member 8.

Figure 3:
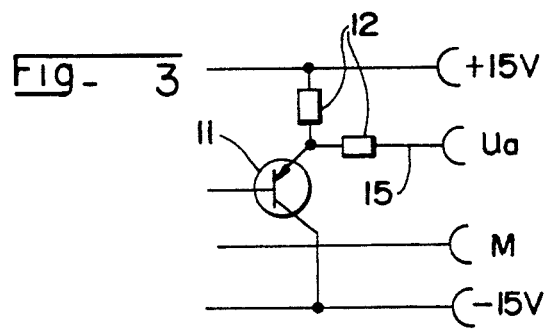
FIG. 3 illustrates circuitry including details of the output stage of the proximity sensor of the load measuring apparatus.
Figure 4:
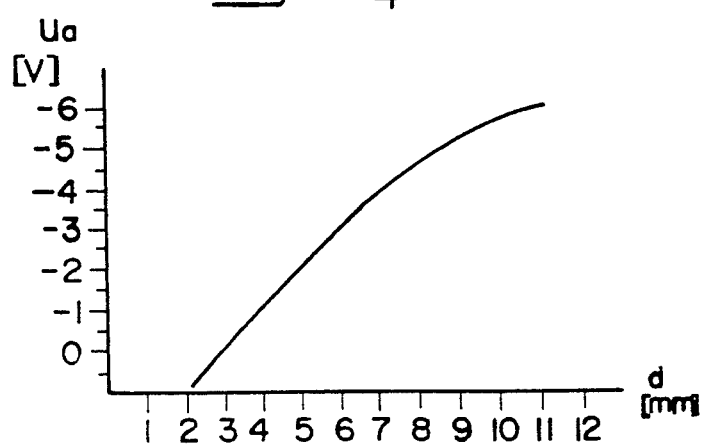
FIG. 4 is a diagram for explaining the operation of the load measuring apparatus of the present invention.

In the exemplary embodiment under discussion, there is advantageously used as the proximity sensor 9 a commercially available inductive proximity sensor or switch which is marketed under the commercial designation "EFECTOR IA-4010-DNOG/IA5034" from Efector Inc., located at 805 Springdale Drive, Whiteland Business Park, Exton, Pennsylvania 19341. In this connection the reference plate 8 is formed of steel plating. The leads or lines which respectively are identified in FIG. 3 by +15 volts, −15 volts and M and arranged within a connection cable 10, serve for the voltage supply of the proximity sensor 9, and the output lead or conductor 15 carries the analog output potential or signal Ua which is dependent upon the magnitude of th predetermined spacing d between the proximity sensor 9 and the reference plate member 8. This analog output potential or signal Ua is generated by an output stage, which comprises a transistor 11 in grounded-collector circuit configuration and the resistances 12. The diagram of FIG. 4 illustrates the change of the analog output potential or signal Ua as a function of changes in the size of the predetermined spacing d between the proximity sensor 9 and the reference plate member 8.

As already previously indicated, the proximity sensor 9 also could be constituted by a conventional analog capacitive proximity sensor.

While there are shown and described present preferred embodiments of the invention, it is distinctly to be understood the invention is not limited thereto, but may be otherwise variously embodied and practiced within the scope of the following claims.

What is claimed is:

1. In a load measuring apparatus for an elevator car having a roof and supported by a support frame suspended at a traction cable means, the support frame comprising a lower crossbeam carrying a floor frame mounted on isolation pads, said floor frame also acting as a lateral guidance for said elevator car, with said isolation pads being interposed between said floor frame and said elevator car, said support frame further including substantially vertically extending support members and an upper crossbeam connected with the traction cable means, the improvement which comprises:

a proximity sensor arranged at the upper crossbeam;
the proximity sensor having an output lead;
a reference plate member arranged at the roof of the elevator car;
the proximity sensor being disposed in frontal spaced, contactless, relationship, free of physical interaction, at a predetermined vertical spacing with respect to the reference plate member in a no-load condition of the elevator car;
the predetermined vertical spacing of the proximity sensor with respect to the reference plate member increasing in dependency upon the vertical compression, in a substantially straight line manner, of the isolation pads in the presence of a load condition at the elevator car, and
the proximity sensor carrying at the output lead an output potential, which is dependent upon the magnitude of the predetermined vertical spacing between the proximity sensor and the reference plate member.

2. In a load measuring apparatus for an elevator car according to claim 1, wherein:

the proximity sensor comprises an inductive proximity sensor; and
the reference plate member is formed of steel plating.

3. In a load measuring apparatus for an elevator car according to claim 1, wherein:

the proximity sensor comprises a capacitive proximity sensor.

4. In a load measuring apparatus for an elevator car according to claim 1, wherein:

the output lead of the proximity sensor carries an analog output potential which is dependent upon the magnitude of the predetermined vertical spacing between the proximity sensor and the reference plate member.

5. The combination of an elevator structure including an elevator car having a roof and a load measuring apparatus for the elevator car, wherein:

the elevator structure comprises:
a support frame suspended at traction cable means for supporting the elevator car;
a floor frame provided for the elevator car;
the support frame comprising a lower crossbeam carrying the floor frame mounted on isolation pads, said floor frame also acting as a lateral guidance for said elevator car, with said isolation pads being interposed between said floor frame and said elevator car, said support frame further including substantially vertically extending support members and an upper crossbeam connected with the traction cable means; and
the load measuring apparatus comprises:
a proximity sensor arranged at the upper crossbeam;
the proximity sensor having lead means;
a reference plate member arranged at the roof of the elevator car;
the proximity sensor being disposed in frontal spaced, contactless, relationship, free of physical interaction, at a predetermined vertical spacing with respect to the reference plate member in a no-load condition of the elevator car;

the predetermined vertical spacing of the proximity sensor with respect to the reference plate member increasing as a function of the vertical compression, in a substantially straight line manner, of the isolation pads located between the elevator car floor and the lower crossbeams of the support frame in the presence of a load condition at the elevator car; and the proximity sensor carrying at the lead means an output potential which is dependent upon the magnitude of the predetermined vertical spacing between the proximity sensor and the reference plate member.

* * * * *